United States Patent [19]

Stelter et al.

[11] 4,267,606

[45] May 12, 1981

[54] WIRELESS, MULTI-CHANNEL REMOTE CONTROL UNIT FOR TOYS

[76] Inventors: Heino Stelter, 2 Hasenstrasse, 851 Fuerth; Manfred Preiss, Nuernberger Str. 59, 8501 Rosstal; Udo Polka, Gemuenderstr. 10, 7118 Ingelfingen, all of Fed. Rep. of Germany

[21] Appl. No.: 42,100

[22] Filed: May 24, 1979

[51] Int. Cl.³ .................................................. H04B 9/00
[52] U.S. Cl. .................................. 455/603; 455/608; 455/613
[58] Field of Search ............... 250/199; 455/603, 608, 455/613

[56] References Cited

U.S. PATENT DOCUMENTS

| | | | |
|---|---|---|---|
| 3,820,070 | 6/1974 | Fox | 250/199 |
| 3,842,403 | 10/1974 | Konopka | 250/199 |
| 3,924,120 | 12/1975 | Cox | 250/199 |
| 3,928,760 | 12/1975 | Isoda | 455/603 |
| 4,091,272 | 5/1978 | Richter | 250/199 |
| 4,156,134 | 5/1979 | Minner | 455/603 |
| 4,156,810 | 5/1979 | Igarashi | 250/199 |
| 4,169,226 | 9/1979 | Fukuji | 250/199 |

*Primary Examiner*—Howard W. Britton
*Attorney, Agent, or Firm*—Daniel Jay Tick

[57] ABSTRACT

A remote control unit has an infrared transmitter which includes a coding device for correlating a coded series pulse train to each of a plurality of channels. The unit also includes at least one infrared receiver having a decoding device for decoding the coded series pulse trains received from the trasmitter. The decoding device includes a plurality of outputs, one of which is correlated with at least one of the channels of the transmitter.

6 Claims, 4 Drawing Figures

WIRELESS, MULTI-CHANNEL REMOTE CONTROL UNIT FOR TOYS

The invention relates to a wireless, multi-channel remote control unit for toys with a transmitter and a receiver.

Multi-channel radio remote controls employing a high frequency transmitter and a high frequency receiver are relatively expensive, since an individual, tuned circuit is required for each channel, and, furthermore, such controls require governmental approval. Admittedly, radio remote controls have a wide range which, however, is not always required for remote control of toys, especially when such remote control is undertaken only in apartments.

The invention, therefore, is based on providing a wireless, multi-channel control unit for toys which, compared with the high frequency units previously used for toys, is considerably cheaper, smaller and handier.

BRIEF SUMMARY OF THE INVENTION

The transmitter of the remote control unit of the invention is an infrared transmitter having a coding device which correlates a coded serial pulse train to each channel. The infrared receiver correlated with the infrared transmitter has a decoding device to decode the series pulse trains received. One output of the decoding device of the receiver is correlated with at least one part of the channels of the transmitter, at a time. The remote control unit of the invention thus uses an infrared transmitter and an infrared receiver for remote control of toys, whereby control signals are transmitted in the form of coded series pulse trains. Such pulse trains can be generated and decoded, respectively, with customary ICs or integrated circuits, which are very cheap, and it is not difficult for anyone skilled in the art to provide proper circuitry for this purpose.

Infrared remote control units in themselves are known and used for remote control of television sets, for example. Infrared control for toys with very many different functions, however, has so far not been proposed. A cable for transmitting the control commands was used for toys when remote control was to be effected over a short distance of some meters only, in order to keep the remote control system as inexpensive as possible.

The use of an infrared control unit for transmission of control commands, rather than a cable, offers the advantage that a single infrared transmitter may be used to control several toys each of which is fitted with an infrared receiver. From the plurality of channels of the infrared transmitter one part is correlated to a first infrared receiver, another part to a second infrared receiver, and so on. Apart from the higher number of switches for channel selection, the circuit complexity of the infrared transmitter will not be increased when increasing the number of channels if customary ICs are used.

The channels of the infrared transmitter are preferably divided into groups of like numbers and are selectable by switches which interact on the matrix plan. A first number of the switches serves to select the group of channels, and a second number of the switches serves to select a channel from the selected group of channels. This feature, considered to be essential within the scope of the invention, offers the advantage that the number of switches for selection of the channels can be kept low. A decimal keyboard may also be used and also reduces the switches where there are a very large number of channels.

When several infrared receivers are used with only one transmitter, it will then be of advantage to correlate the outputs of the decoding device of one infrared receiver with each group of channels of the infrared transmitter, so that the desired infrared receiver and, accordingly, the toy to be controlled just then, can be selected via the switches of the group of channels, and the individual control commands can then be given via the second number of switches.

The decoding device of the infrared receiver suitably incorporates a device for converting the received, coded series pulse trains into binary coded signals. A vice for selection of a group of channels from the number of the channels of the infrared transmitter is correlated with the converting device, whereby one group of channels comprises not more than ten channels. The coding device also has a BCD/decimal converter in which one output is correlated to each binary coded signal. The device providing the binary coded signals can decode all coded series pulse trains, whereby, however, each infrared receiver is correlated with a proper group of channels by the device for selection of a group of channels from the number of channels of the infrared transmitter having a plurality of infrared receivers. This device, provided in the infrared receiver for selection of a group of channels, may comprise wire bridges, each of which is correlated to a group of channels, whereby the wire bridges are interrupted except for that which is correlated with the desired group of channels. Interruption of the wire bridges may be provided later; that is, the infrared receivers are first delivered in a condition in which all wire bridges are available, and the unwanted wire bridges are only interrupted when the infrared receiver is built into a toy, for example.

To enable storage of the control signals provided at the outputs of the decoding device of the infrared receiver, a flip-flop is correlated with each two outputs of the decoding device, whereby at least one other output of the decoding device is provided to reset all the flip-flops. Such a flip-flop, for example, can store the control commands "forward drive" and "backward drive", so that, when push-button switches are used, they need not constantly be depressed.

Since daylight may interfere greatly with the reception of infrared signals, a filter is provided in another embodiment of the invention to filter out the daylight.

Furthermore, since the level of the received coded series pulse train changes to a great extent as a function of the distance between the infrared receiver and the infrared transmitter, the infrared receiver is suitably provided with a preamplifier to balance the different intensities of the signals received.

In principle, one infrared diode in the infrared transmitter is sufficient. However, it must be dimensioned according to the required, relatively high performance requirements. That is why, in another embodiment of the invention, a plurality of infrared diodes is used in the infrared transmitter. A single, high-performance, diode provides the same effect as a plurality of low-performance infrared diodes, regarding the range. However, the replacement of one high-performance infrared diode by a plurality of low-performance diodes results in a considerably less expensive unit.

Furthermore, in another embodiment of the invention, in order to enable control of the function, the infrared transmitter has a light-emitting diode upon which the coded series pulse trains impinge. The light-emitting diode thus lights the clock of the applied and radiated coded series pulse trains.

In a preferred embodiment of the invention, the infrared transmitter has three groups of channels, each having seven channels.

BRIEF DESCRIPTION OF THE DRAWINGS

In order that the invention may be readily carries into effect, it will now be described with reference to the accompanying drawings, wherein.

DETAILED DESCRIPTION OF THE INVENTION

Figure 1:
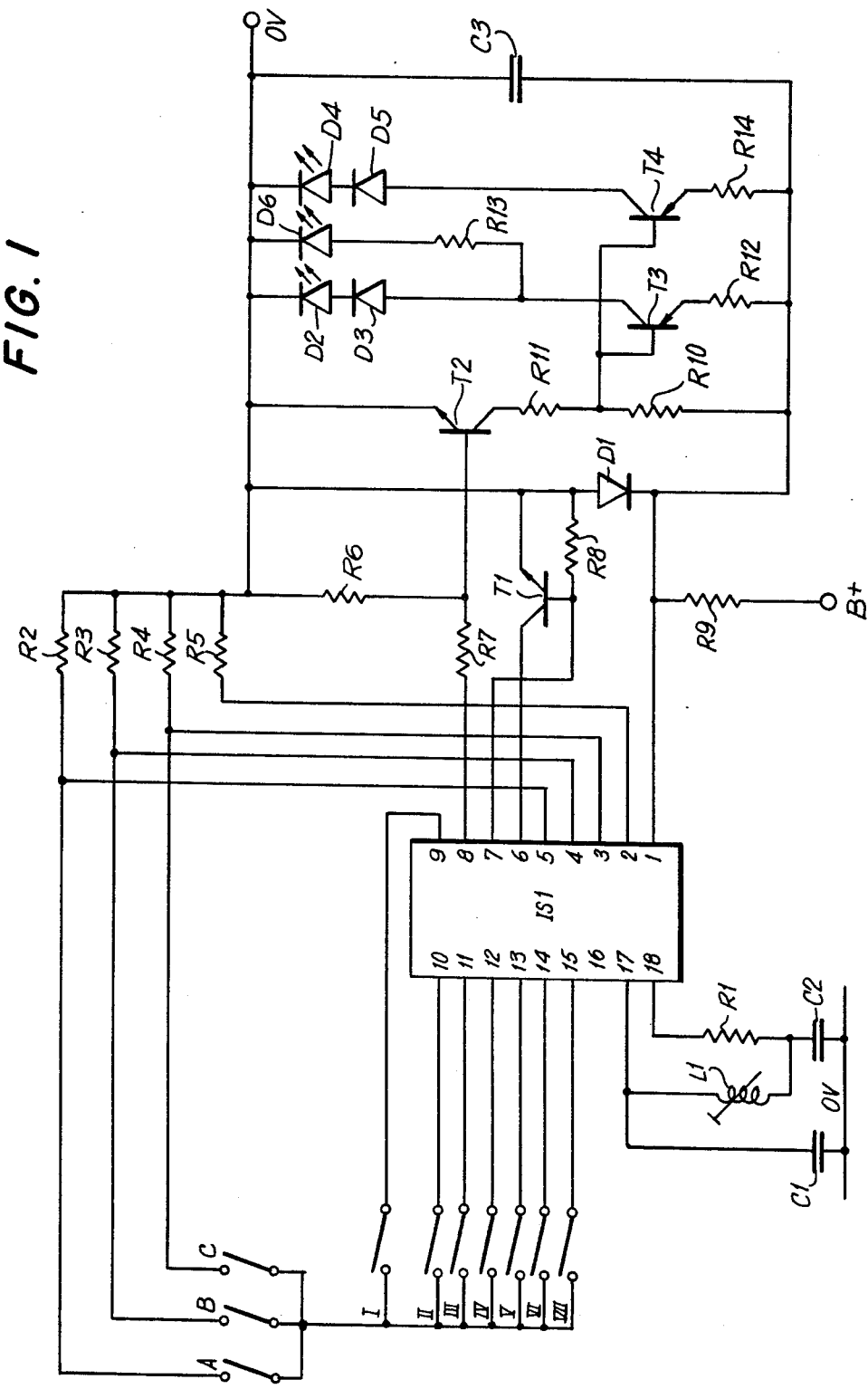
FIG. 1 is a circuit diagram of an embodiment of the infrared transmitter of the remote control unit of the invention.

The infrared transmitter illustrated in FIG. 1 includes an integrated circuit IS1 with eighteen connectors, which functions as a coding device and which is able to release a coded serial pulse train at the connector 8, whereby coding of the series pulse train depends upon which connector of the connectors 9 to 15 is connected with which connector of the connectors 3 to 5. The connectors 3 to 5 are connected via switches A, B, and C to a bus line from which seven branch lines lead to the connectors 9 to 15. A push-button switch I to VII, is provided in each of the branch lines, respectively. As can be seen, the switches A, B and C, together with the seven push-button switches I to VII, interact on the matrix plan. The respective coding of the provided series pulse train depends upon which of the switches A, B and C and which of the push-buttons I to VII is connected at that time. Thus, a total of three×seven=twenty-one differently coded series pulse trains can be the connector 8, corresponding to twenty-one different channels. The switches A, B and C determine three groups of channels of seven channels each, selected by the pushbuttons I through VII. When any one of the switches A, B and C is closed and one of the push-button switches I to VII is depressed, a coded series pulse train is provided at the connector 8.

The clock frequency of the pulse train is determined by an oscillating circuit having capacitors C1 and C2 and a coil L1. The oscillating circuit is connected to the connectors 17 and 18 of the integrated circuit IS1. The clock frequency is preferably 30 kHz. The pulse trains provided at the connector 8 comprise a maximum of seven pulses, for example, and differ from each other by the points at which the pulse in the pulse train is missing. To facilitate recognition of a pulse train at the receiver, the beginning and the end of provided pulse train is limited at a time by an identification pulse.

The coded series pulse trains provided at the connector 8 of the integrated circuit IS1 are applied to the base electrode of a transistor T2 for preamplification. Final amplification of the preamplified pulse train is then carried out in two parrel-connected final amplification stages comprising transistors T3 and T4. The base electrodes of the transistors T3 and T4 are connected to the collector electrode of the transistor T2. The collector current of the transistors T3 and T4 flows through two series-connected infrared diodes D2 and D3 and D4 and D5, respectively. A light-emitting diode D6 is connected in parallel with the pair of infrared diodes D2 and D3 and makes visible the impingement on the infrared diodes.

Apart from the foregoing, the connection of the integrated circuit IS1 depends upon the type selected.

Figure 2:
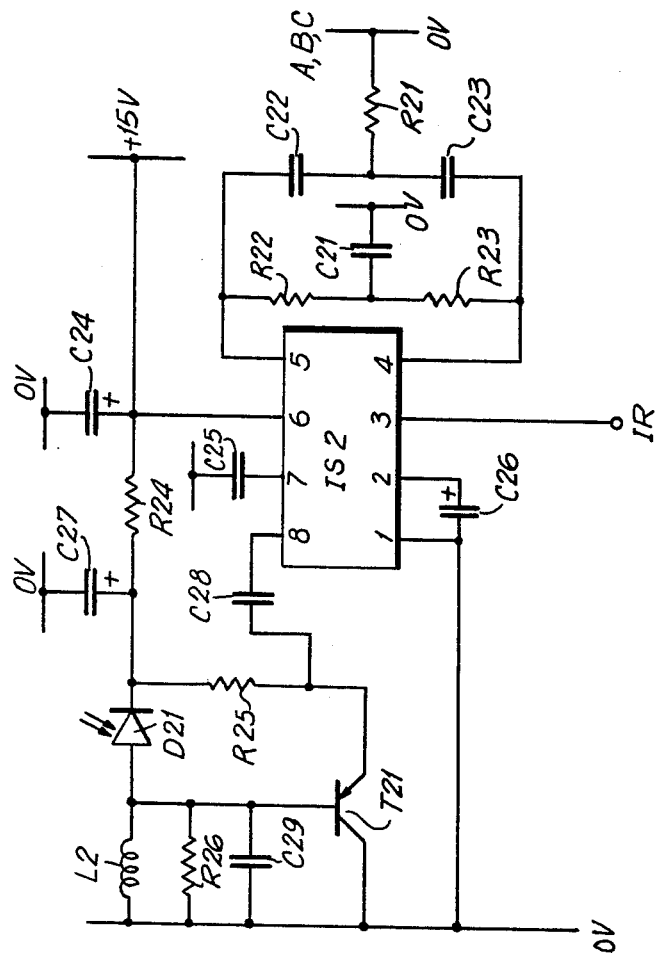
FIG. 2 is a circuit diagram of an embodiment of the preamplifier of the infrared receiver.

FIG. 2 shows the circuit diagram of a preamplification device of an infrared receiver. The infrared signals radiated by the infrared transmitter are received with the aid of an infrared diode D21 and converted into electrical pulses. After interference frequencies caused by the daylight are filtered out with the aid of an oscillating circuit incorporating a coil L2 and a capacitor C29, and after preamplification via a transistor T21, the electrical pulses are applied to the connector 8 of an integrated circuit IS2 across a capacitor C28. The integrated circuit IS2 serves to amplify the received pulse trains and has a gain of 100 dB. It is able to compensate for different intensities of the received signals caused by the different distances between the infrared receiver and the infrared transmitter, so that there will be no overdrive at any distance between the receiver and the transmitter. A switching unit incorporating resistors R21, R22 and R23 and capacitors C21, C22 and C23 is connected to the connectors 4 and 5 of the integrated circuit IS2 and provides symmetry of the working point of said integrated circuit. Capacitors C24 and C27, as well as resistor R24, merely have a smoothing function. The amplified and balanced incoming signals are provided at the connector 3 of the integrated circuit IS2. In other respects, as in the integrated circuit IS1, the wiring of the integrated circuit IS2 in particular depends upon the types selected.

Figure 3:
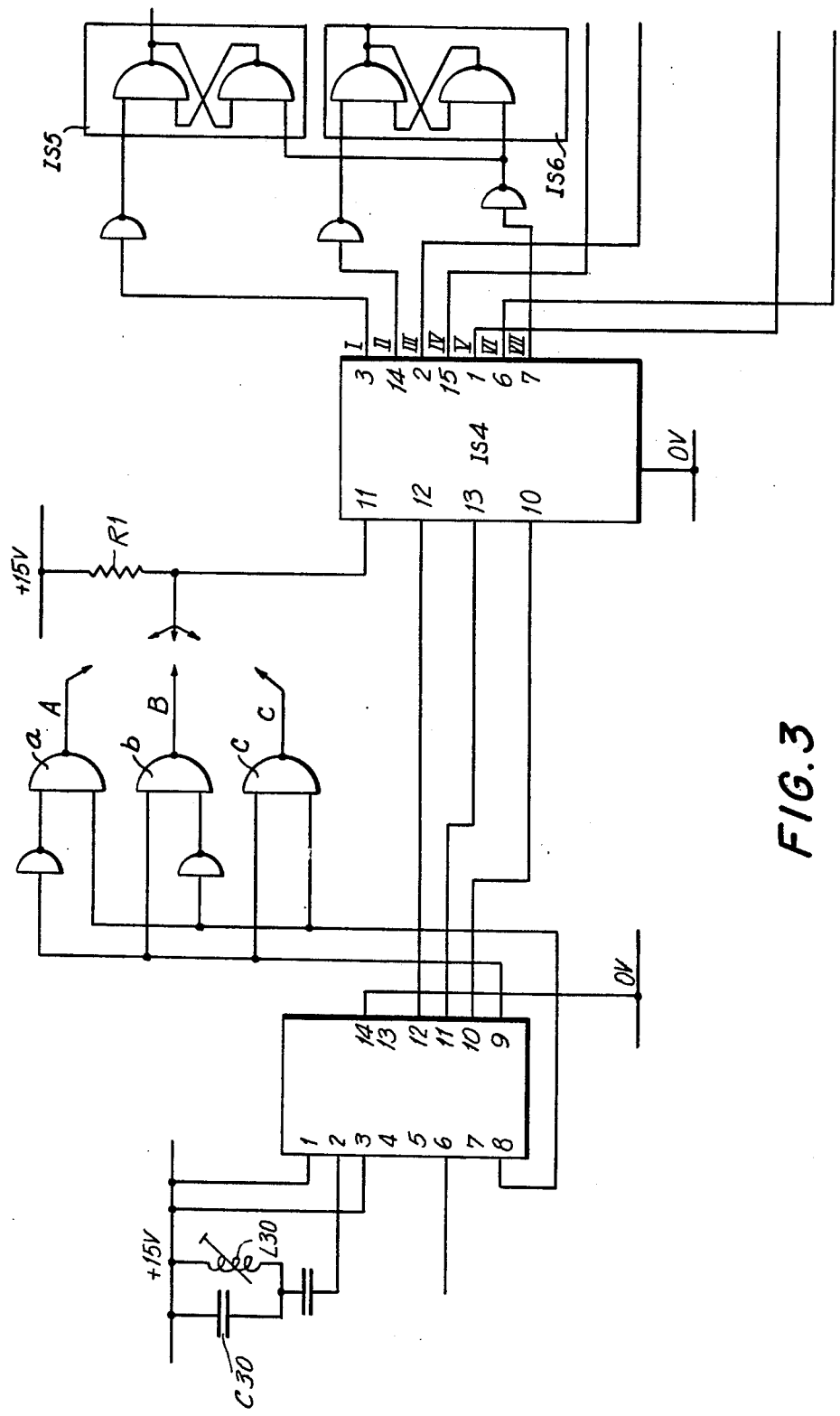
FIG. 3 is a circuit diagram of an embodiment of the decoding device including a storage device of the infrared receiver of the remote control unit of the invention.

The coded series pulse train provided at the connector 3 of the integrated circuit IS2 is fed to the connector 6 of an integrated circuit IS3, which is part of a decoding device shown in FIG. 3. The connectors 10, 11 and 12 of the integrated circuit IS3 provide the received signal as a series pulse train at the connector in binary coded form. For binary coding, three bits, corresponding to the three connectors 9, 10 and 11, are completely sufficient, since depending upon the application of the connectors 8 and 9 of the integrated circuit IS3, one of the three groups of channels having seven channels each is selected. The application of the connectors 8 and 9 of the integrated circuit IS3 depends upon which of three circuits a, b and c is connected to the voltage source via a wire bridge A, B or C. Each circuit a, b and c has two outputs, one of which is connected to the connector 8 and the other of which is connected to the connector 9 of the integrated circuit IS3. One output of the circuit a is connected to the connector 9 of the integrated circuit IS3 via an inverter, and one output of the circuit b is connected to the connector 8 of said integrated circuit via a second inverter. The circuit c are directly connected to the connectors 8 and 9 of the integrated circuit IS3. A high level voltage is available at the outputs of the circuit connected with the voltage source is a high level at a time, which is reduced to a lower level at the correlated connector 8 or 9 of the integrated circuit IS3 when an inverter is connected inbetween. The clock frequency of the integrated circuit IS3 is set by an oscillating circuit incorporating a coil L30 and a capacitor C30, and is balanced according to the type selected.

The decoding device of FIG. 3 further comprises an integrated circuit IS4, which is a BCD/decimal converter. At its inputs 10, 13, 12, it receives the binary coded signals provided by the integrated circuit IS3, and provides such signals at its outputs 3,14,2,15,1,6 and 7 in decimal coded form. One channel out of one of the groups of channels selected by the wire bridges A, B or C is thus correlated with each of these outputs of the integrated circuit IS4.

As shown in FIG. 3, each of the outputs 3 and 4 of the integrated circuit IS4 is correlated with a flip-flop IS5 and IS6, respectively, for storing the received signals. The output 7 of the integrated circuit IS4 is connected to the reset inputs of the flip-flops IS5 and IS6. The flip-flops IS5 and IS6 can be connected to transistorized switches, for example, to permit a motor in the toy fitted with the infrared receiver to run forward or in reverse. The other outputs 2,15,1 and 6 of the integrated circuit IS4 are provided for proportional control and thus, of course, are not connected to the flip-flops.

When several infrared receivers are used with a single transmitter, the infrared receivers are distinguished only by what wire bridges A, B and C are not interrupted. They are thus correlated with different groups of channels, so that several toys can be controlled independently of each other with only one transmitter.

Figure 4:
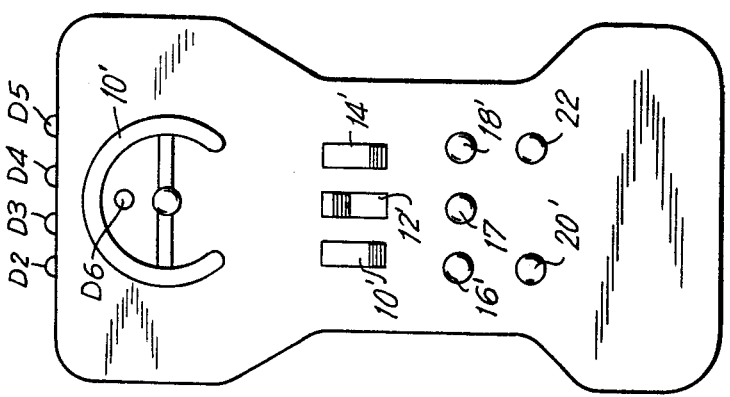
FIG. 4 is a plan view of the case of the infrared transmitter of the remote control unit of the invention.

FIG. 4 is an example of a plan view of the case of an infrared transmitter designed in accordance with FIG. 1. The case of the infrared transmitter essentially has the form of an "I" and is shaped in such a way that it can conveniently be gripped at its center part from below. The four infrared diodes D2 to D5 are provided at the end surface of the case directed away from the user's body Three sliding switches 10', 12' and 14' are provided on the upper longitudinal surface of the case and are correlated with the switches A, B and C of the circuit of FIG. 1 for selection of the group of channels. Furthermore, five push-button switches 16', 17', 18', 20 and are provided on the upper longitudinal surface and are correlated with the channels I, II, IV, V and for example. The push-button 16' may be used for the command "forward", the push-button switch 17' the command "reverse", pushbutton switch 18' for the command "fast", the push-button switch 20' may be used for the command "slow", and the push-button switch 22' may be used for the command "stop", for example. Also, a steering wheel 21' is provided on the same surface of the case and permits giving the commands "right", "straight" and "left". The channels III and IV are correlated to the steering wheel 21'. The light-emitting diode D6 of FIG. 1 is provided under the steering wheel 21' as a pilot light.

The remote control unit of the invention does not require an ON and OFF switch for the power supply, the current consumption of the system is very low when signals are not transmitted.

Siemens devices, types SAB 3210, SAB 4050, SAB 3271 and SCL 4028 may be used as the integrated circuits IS1, IS2, IS3 and IS4, respectively.

We claim:

1. A wireless, multi-channel remote control unit for toys, said remote control unit comprising
    an infrared transmitter including a coding device for correlating a coded series pulse train to each of a plurality of channels; and
    at least one infrared receiver including a decoding device for decoding the coded series pulse trains received from the transmitter, said decoding device including a plurality of outputs one of which is correlated with at least one of the channels of the transmitter, the channels of said transmitter being divided into groups, each group having the same number of channels, and switch means interacting in a matrix manner for selecting said channels, said switch means comprising a first group of switches for selecting a group of said groups of channels and a second group of switches for selecting a channel from a selected group of channels.

2. A wireless, multi-channel remote control unit for toys as claimed in claim 1, wherein the outputs of said decoding device are correlated to a group of channels of said transmitter.

3. A wireless, multi-channel remote control unit for toys are claimed in claim 1, wherein said transmitter has 3 groups of channels, each group having 7 channels.

4. A wireless, multi-channel remote control unit for toys as claimed in claim 1, wherein said decoding device further includes converting means for converting the coded series pulse trains received from the transmitter to binary coded signals, selecting means connected to and correlated with said converting means for selecting a group of channels of said transmitter, said group having a maximum of 10 channels, and BCD/decimal converting means connected to said converting means and having a plurality of outputs which function as the outputs of said decoding device, one of said outputs being correlated with each of said binary coded signals.

5. A wireless, multi-channel remote control unit for toys as claimed in claim 4, wherein said receiver further includes flip-flops connected to and correlated with respective outputs of said decoding device, one of the outputs of said decoding device being connected to said flip-flops for resetting said flip-flops.

6. A wireless, multi-channel remote control unit for toys as claimed in claim 4, wherein said selecting means comprises interruptible wire bridges each associated with a corresponding one of the groups of channels of said transmitter.

* * * * *